United States Patent [19]
Kyutoku et al.

[11] Patent Number: 5,242,723
[45] Date of Patent: Sep. 7, 1993

[54] FORMED THERMAL INSULATOR AND PROCESS FOR PREPARATION OF SAME

[75] Inventors: Hirofumi Kyutoku, Ikoma; Kimio Kitano; Kengo Hamada, both of Osaka; Koichi Yamamoto, Hyogo; Takahiko Yoshikawa, Yao, all of Japan

[73] Assignees: Osaka Gas Company, Ltd.; Nikko Kasei Co., Ltd., both of Japan

[21] Appl. No.: 938,532

[22] Filed: Sep. 2, 1992

Related U.S. Application Data

[63] Continuation of Ser. No. 474,083, filed as PCT/JP89/00840, Aug. 18, 1989, abandoned.

[30] Foreign Application Priority Data

Aug. 19, 1988 [JP] Japan ................................ 206998

[51] Int. Cl.$^5$ .................... B32B 9/04; B32B 1/08; B32B 7/02
[52] U.S. Cl. .................... 428/36.1; 428/36.9; 428/36.91; 428/408; 428/282; 428/920; 428/284; 428/902; 428/285; 428/218; 138/177; 138/141
[58] Field of Search ............ 428/408, 212, 920, 34.5, 428/284, 902, 36.9, 36.1, 36.91, 218, 285, 282; 138/141, 177

[56] References Cited

U.S. PATENT DOCUMENTS

| | | | |
|---|---|---|---|
| 3,844,877 | 10/1974 | Wessendorf et al. | 161/156 |
| 4,104,783 | 8/1978 | Schultz et al. | 29/451 |
| 4,777,086 | 10/1988 | Madden et al. | 428/282 |

FOREIGN PATENT DOCUMENTS

| | | |
|---|---|---|
| 3307090 | 6/1984 | Fed. Rep. of Germany . |
| 3433180 | 4/1985 | Fed. Rep. of Germany . |
| 1177988 | 4/1959 | France . |
| 1497527 | 6/1966 | France . |
| 50-35930 | 11/1975 | Japan . |
| 58-29129 | 6/1983 | Japan . |

Primary Examiner—Ellis P. Robinson
Assistant Examiner—Charles R. Nold
Attorney, Agent, or Firm—Larson and Taylor

[57] ABSTRACT

The present invention provides: (1) a formed tubular thermal insulator comprising a felt piece of carbon fibers spirally wound to form a laminate of felt layers integrally bonded to each other with the carbonized substance present between the felt layers with substantially no wavy deformation of spiral winding form, and (2) a process for preparing a formed thermal insulator, the process comprising spirally winding a felt piece of carbon fibers and a film and/or net with a carbonizable resin inserted therebetween while applying a tensile force on the film and/or net to form a laminate, followed by curing and carbonization.

5 Claims, 3 Drawing Sheets $R_2 < R_1$ $R_2 > R_1$

FORMED THERMAL INSULATOR AND PROCESS FOR PREPARATION OF SAME

This application is a continuation of U.S. application Ser. No. 474,083, filed as PCT/JP89/00840, Aug. 18, 1989, now abandoned.

FIELD OF THE INVENTION

The present invention relates to a formed thermal insulator and a process for preparation of the same and more particularly to a formed thermal insulator suitable for use as a thermal insulator in high-temperature heat treatment of products and a process for preparation of the same.

BACKGROUND OF THE INVENTION

In recent years with the increase of demands for semiconductors, functional ceramics and the like, high-temperature heat treatments have been increasingly carried out employing a vacuum furnace, a furnace for growth of monocrystals for semiconductors, a furnace for sintering ceramics, a kiln for calcining C/C composites or the like. Such high-temperature heat treatments need thermal insulators excellent in resistance to heat and heat insulation and unlikely to have the properties impaired at high temperatures. In view of the need, there are increased demands for thermal insulators prepared from carbon fibers and particularly formed thermal insulators which have a self-supporting ability needed for direct installation on the interior of a furnace without use of a support and which are easy to install on the furnace interior. It is also strongly desired to improve methods for molding such formed thermal insulators in order to reduce the production costs and to enhance the dimensional precision.

Feltlike carbon fibers useful as base materials for such formed thermal insulators (hereinafter referred to as "carbon fiber felt") have such a low bulk density that they need to be subjected to compression molding until they are given the desired bulk density required of thermal insulators.

In view of the above prior art problems, a method for producing formed thermal insulators was proposed which comprises impregnating a carbon fiber felt piece with a carbonizable resin, laminating the resin-impregnated felt piece under compression into a molded body of the desired thickness and bulk density and firing the molded body (Japanese Examined Patent Publication No. 35930/1975). The disclosed prior art includes a method for producing a formed thermal insulator having the desired bulk density which comprises winding around a mandrel a felt piece impregnated with a carbonizable resin, externally enclosing the winding with a metal foil, further binding it with a metal band for compression and curing and carbonizing the resin in the felt piece being compressed.

Another method proposed for producing a formed multi-layered thermal insulator for a vacuum furnace comprises adhering a carbon fiber felt piece to a graphite sheet of high density with a carbonaceous binder (Japanese Examined Utility Model Publication No. 29129/1983).

However, the method disclosed in Japanese Examined Patent Publication No. 35930/1975 has drawbacks. While the method is capable of adjusting the bulk density of the felt by control of the bulk compressibility and can produce a formed insulation material of excellent heat insulation property, the compression applied in the method can not uniformly act on the molded product therethroughout, inducing a pressure distribution between the surface layer and the internal layer portions of the molded product and an uneven bulk density distribution. The method also entails difficulties in controlling the bulk density distribution and producing a formed thermal insulator of excellent heat insulation property. Moreover, because of a low tension applicable to the felt piece, the method requires external clamping of the laminated felt piece with a metal band after externally enclosing the laminated felt with a metal foil, which results in the disarray of the spiral winding form into numerous wavelike deformities in the surface and internal portions of the thermal insulator. Thus the method fails to obtain molded bodies outstanding in surface smoothness and uniformity and having a good appearance. The method has a further problem of involving numerous steps and thus being low in productivity.

Japanese Examined Utility Model Publication No. 29179/1983 discloses a thermal insulator composed of a molded carbon fiber felt piece having graphite sheets attached thereto in the surface and intermediate portions. The disclosed thermal insulator is allegedly capable of preventing the damage to the material which would occur due to the penetration of molten metal into the material when used as a thermal insulator for a high-temperature vacuum melting furnace. Yet the bulk density of this thermal insulator is substantially equal to that of conventional thermal insulators and is not variable in the direction of the thickness. The thermal insulator has another problem that graphite is expensive.

SUMMARY OF THE INVENTION

It is an object of the present invention to provide a formed thermal insulator having a high bulk density and excellent in heat insulation property and surface smoothness.

It is another object of the invention to provide a formed thermal insulator having a bulk density variable in the direction of the radius and excellent in heat insulation property.

It is a further object of the invention to provide a process for producing a formed thermal insulator excellent in the foregoing properties with a high productivity without conducting a complicated procedure.

According to the invention, there is provided a formed tubular thermal insulator characterized in that a carbon fiber felt piece is spirally wound to form a laminate of felt layers so that the felt layers are integrally bonded to each other with the carbonized resin present between the felt layers and are continuously laminated in a circumferential direction without wavy deformation of the spiral winding form.

Since the carbon fiber felt piece in the formed thermal insulator of the invention is spirally wound into a tubular shape with the carbonized layers of the film and/or net and resin existing between the felt layers, the thermal insulator is free of surface irregularities due to the clamping of the laminate by a metal band and the like, and is excellent in uniformity and composed of felt layers integrally combined with each other by the carbonized layers of the film and/or net and resin present between the felt layers having the predetermined bulk density.

The present invention further provides a process for preparing a formed thermal insulator, the process comprising the steps of causing at least one of a felt piece and a film and/or net to retain a carbonizable resin, the felt piece comprising at least one kind of carbon fibers and fibers convertible into carbon fibers by high-temperature heat treatment; winding the felt piece and the film and/or net on a tubular take-up drum while exerting a tensile force on the film and/or net to form a laminate; curing the resin in the laminate; and carbonizing the laminate in an inert atmosphere or in a vacuum.

Examples of fibers useful in the invention and convertible into carbon fibers by high-temperature heat treatment include phenolic resin fibers, rayon fibers treated for fire resistance, polyacrylonitrile fibers, pitch fibers treated for infusibility, etc. The term "felt piece of at least one kind of carbon fibers and fibers convertible into carbon fibers by high-temperature treatment" used herein is hereinafter abbreviated to "felt piece of carbon fibers" in the following description for simplification of the expression.

According to the process of the invention for preparing the formed thermal insulator, the felt piece of carbon fibers is adhered to the film and/or net by the resin interposed therebetween, and a tubular uniform laminate formed in conformity with the form of a take-up drum can be obtained. The felt piece of carbon fibers is unlikely to break during the winding because the felt piece is wound exerting a tensile force on the film and/or net. The felt piece is pressed against the take-up drum to the desired thickness by virtue of the centripetal force as a component of the tensile force acting on the film and/or net. In this case, a tubular laminate having the desired bulk compressibility in the direction of the thickness and thus the desired bulk density distribution can be obtained by varying the tensile force under control. Subsequently the laminate is subjected to carbonization treatment, giving the desired formed thermal insulator.

When pressure is applied to the felt piece of carbon fibers and the film and/or net with a pressure roller disposed as opposed to the take-up drum, the felt piece and the film and/or net can be wound in a more uniformly compressed state because of the tensile force acting on the film and/or net as well as the pressure, with the result that there is provided a formed thermal insulator having a higher degree of uniformity and the desired bulk density.

The resin to be carbonized may be impregnated into the felt piece of carbon fibers or may be deposited on the film and/or net before winding, or alternatively may be applied directly during winding. When a great tensile force is exerted on the film and/or net during the winding of the felt piece of carbon fibers on the take-up drum, a formed thermal insulator of high bulk density is produced, whereas a less tensile force acting on the film and/or net gives a formed thermal insulator of low bulk density.

The following terms used herein will be defined below.

The term "carbonization" refers to a high-temperature calcination treatment of carbon-containing materials such as pitch; polyacrylonitrile, phenolic resin, rayon or like polymers.

The term "carbonized layer" is intended to denote a layer formed by carbonization of the carbon-containing material. The carbonized layer is one having bonded the carbon fibers present internally and externally thereof. Such layers need not be in the form of a continuously flat plate or a sheet and may be present as discontinuously dispersed like dotted islands.

The formed thermal insulator of the present invention is characterized in that the amount of the carbonized film and/or net and resin between the felt layers exceeds the amount of the carbonized resin in the felt piece.

According to the nomenclature in the carbon fiber industry, even the carbon fibers heat-treated to about 2,000° C. and having a crystal structure like that of partly graphitized fibers may sometimes be called graphitized fibers. Such treatment is included herein in the concept of carbonization.

The fibers obtained by heat treatment of common carbon fibers to about 2,000° C. or higher are herein also referred to as carbon fibers.

BRIEF DESCRIPTION OF THE DRAWINGS

The present invention will be described below in more detail with reference to the drawings when required in which.

DETAILED DESCRIPTION OF THE PREFERRED EMBODIMENT

Figure 1:
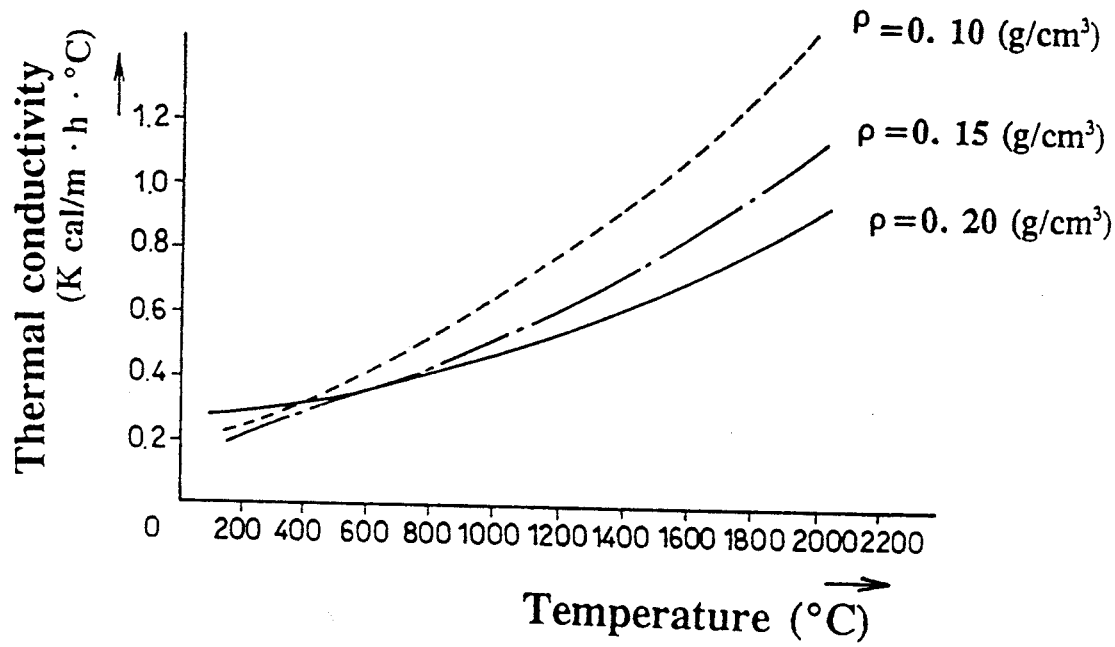
FIG. 1 is a graph showing the relationship between the thermal conductivity and the temperature of formed thermal insulators different from each other in bulk density.

Examples of useful base materials for felt pieces of carbon fibers constituting the formed thermal insulators are various and include those prepared from polyacrylonitrile, phenolic resin, rayon or like polymeric fibers, pitch, liquid crystal pitch or the like. The base material may be one made of a carbonaceous material, graphite material or the like and may be of various types including those having, e.g. high strength, high extensibility, high flexibility or the like and those of general purpose type. Useful base materials are those having a suitable fiber diameter of, e.g., about 5 to about 20 $\mu$m.

The thickness of the felt piece of carbon fibers as a constituent material for the formed thermal insulator is not specifically limited and may be usually in the range of about 5 to about 20 mm although suitably determinable according to the thickness of the desired formed thermal insulator and the like. The number of felt layers can be suitably determined according to the size of the furnace and the like to be provided with the thermal insulator, the desired heat insulation property and the like. The bulk density of the felt piece of carbon fibers as measured prior to winding is usually about 0.03 to about 0.08 g/cm$^3$ but needs to be increased to as high as about 0.1 to about 0.4 g/cm$^2$ when the thermal insulator is used at a temperature of about 1,500° to about 2,500° C.

The film and net are not specifically limited insofar as they have properties which will not impair the adhesion to the felt piece of carbon fibers. Useful films and nets may be those made of polymers as exemplified below. More specific examples of films and nets are a single film and/or net or a composite film and/or net composed of at least two laminated films or nets made of polyethylene terephthalate, polybutylene terephthalate or like polyesters, polycarbonate, polypropylene, polystyrene, acrylic resin, polyurethane, polyamide, polyimide, polysulfone, polyether sulfone, polyphenylene oxide or the like. The film may be one having permeability sufficient to increase the retentivity of the resin, e.g. a porous one, and may be one having a suitable thickness, e.g. 5 to 500 μm thickness. In use of a wide-meshed net, the resin needs to be impregnated into the felt piece of carbon fibers, whereas in use of a fine-meshed net, the resin may be retained as a coating thereon, as in the film.

Resins useful for impregnation or coating can be any of carbonizable resins which do not reduce the adhesion to the felt piece of carbon fibers. Examples of useful resins are phenolic resin, urea resin, epoxy resin, diallyl phthalate resin, polyurethane, unsaturated polyester, polystyrene, saturated polyester, polyvinyl acetate, polyvinyl acetal, acrylic resin, polyamide and like thermosetting resins and thermoplastic resins. These resins are usable singly or at least two of them can be used in mixture. Among the resins useful for impregnation or coating, thermosetting resins, especially phenolic resin, are preferred.

The felt piece of carbon fibers is integrally laminated with the carbonized layers of resin interposed between the felt layers. The carbonized resin layers may be distributed throughout the felt piece as well as in the vicinity of the interface between the laminated felt layers. The formed thermal insulator having the carbonized resin layers distributed entirely through the felt piece has further increased uniformity, shape retention and mechanical strength.

While not specifically limited within the range which will not deteriorate the heat insulation property nor shape retention, the bulk density of the formed thermal insulator is about 0.08 to about 0.5 g/cm$^3$, preferably about 0.1 to about 0.3 g/cm$^3$, more preferably about 0.1 to about 0.2 g/cm$^3$. When the formed thermal insulator has a bulk density of less than 0.08 g/cm$^3$, a reduced heat insulation property results. The bulk density of more than 0.5 g/cm$^3$ increases the thermal capacity and impairs the heat insulation property. Although suitably determinable according to the desired heat insulation property and the like, the thickness of the formed thermal insulator ranges from about 20 to about 200 mm to ensure the effect of heat insulation in high-temperature heat treatment. A suitable form of the formed thermal insulator is a tubular form composed of a wound laminate and a form of hollow ellipse in section. Among various forms, cylinders of hollow circle in section are preferred.

The bulk density of the formed thermal insulator may be uniform in its entirety. Alternatively the bulk density thereof may be, for example, continuously or stepwise reduced from the interior toward the exterior of the material. The relationship between the bulk density and the heat insulation property of the formed thermal insulator is such that generally at high temperatures the heat insulation property tends to enhance as the bulk density increases. FIG. 1 shows the relationship between the thermal conductivity and the temperature, as measured in a nitrogen atmosphere, of the formed thermal insulators of the invention different in bulk density from each other. As seen from FIG. 1, the thermal conductivity, particularly in the high temperature range, decreases as the bulk density $\rho$ increases from 0.1 g/cm$^3$ to 0.2 g/cm$^3$. This means that when the bulk density of the formed thermal insulator is continuously or stepwise varied in the direction of the thickness, a higher heat insulation property is imparted to the formed thermal insulator as a whole. The bulk density and bulk density distribution of the formed thermal insulator can be suitably selected over the foregoing range in accordance with the heat-treating temperature and the desired heat insulation property.

Among the formed thermal insulators of the invention, a preferred embodiment is as follows:

a formed thermal insulator comprising a felt piece of carbon fibers wound into a laminate in the form of hollow cylinder in such manner that the laminated felt layers have interposed therebetween carbonized layers of a film and/or net, preferably a polyester film and/or net and carbonized layers of a thermosetting resin, preferably a thermosetting phenolic resin, the bulk density of the laminate being in the range of 0.1 to 0.5 g/cm$^3$, the bulk density thereof as internally measured being higher than that as externally measured.

The process for preparing the formed thermal insulator of the present invention will be described below in detail.

The process for preparing the formed thermal insulator of the invention comprises the winding step of winding a felt piece of carbon fibers and a film and/or net on a tubular take-up drum to form a laminate and the carbonizing step of curing and carbonizing the film and/or net and the resin in the laminate.

At least one of the felt piece of carbon fibers and the film and/or net to be used in the winding step retains a carbonizable resin in order to adhere the felt piece to the film and/or net. The resin is retained in at least one of the felt piece and the film and/or net layered in contact with each other in the laminate. Usable as the felt piece of carbon fibers are one coated with and impregnated with a resin in its front layer and/or rear layer portions and one having a resin impregnated into and retained in the felt piece in its entirety. Useful films include those having a resin deposited on and retained in at least one of their front and rear sides. The net may be one coated with the resin. It is preferred to use a felt piece of carbon fibers impregnated with a resin on its front and rear sides and a film and/or net coated with a resin on its front and rear sides in order to accomplish the winding operation efficiently and to adjust the bulk density of the laminate according to the kind of the felt piece.

While the felt pieces of carbon fibers, films, nets and resins useful in the invention are as exemplified above, the resin is preferably used in the form of a solution. The solvent for use in preparation of a resin solution is suitably selected according to the kind of the resin and the like from, for example, methanol, ethanol, isopropanol and like alcohols; hexane, octane and like aliphatic hydrocarbons; cyclohexane and like alicyclic hydrocarbons; benzene, toluene, xylene and like aromatic hydrocarbons; acetone, methyl ethyl ketone, dioxane and like ketones; dimethyl ether, diethyl ether, tetrahydrofuran, ethylene glycol dimethyl ether and like ethers; ethyl acetate and like esters; etc. The resin solution has a suitable viscosity in the range which will not impair the impregnability nor the applicability of the solution, usually a resin concentration of about 10 to about 80% by weight.

There is no specific limitation on the amount of the resin for impregnation into the felt piece of carbon fibers and the amount of the resin for coating the film and/or net. The impregnation amount of the resin solution in the felt piece is preferably about 20 to about 160 parts by weight per 100 parts by weight of the felt piece. The amount of less than 20 parts by weight reduces the adhesion of the resin to the felt piece, whereas the amount of larger than 160 parts by weight eliminates the flexibility from the formed thermal insulator. The amount of the liquid resin for coating the film and/or net is usually about 50 to about 300 g/cm². Before winding, the resin solution retained in at least one of the felt piece and the film and/or net may be dried to remove the solvent.

In order to compress the felt piece without action of tension thereon and to form a laminate having the desired bulk density and the desired bulk density distribution, the film and/or net is wound under tension with the felt piece interposed between the layers of film and/or net. Since during the winding in this way, a component of tensile force to be exerted on the film and/or net is caused to act on the felt piece perpendicularly thereof, the felt piece can be wound as compressed. When a constant tensile force is exerted on the film and/or net during this winding, a laminate of uniform bulk density is obtained. When a tensile force is continuously or stepwise varied under control, it is possible to obtain a laminate having a bulk compressibility and thus a bulk density continuously or stepwise varied in the direction of the thickness depending on the variation of tensile force. For example, when a greater tensile force is applied to the film and/or net in the initial winding stage and a decreased tensile force is applied thereafter, the obtained laminate has a bulk density higher in its interior and lower in its exterior. In other words, the bulk density distribution of the laminate is freely adjustable by controlling the tensile force to be exerted on the film and/or net. Furthermore the process of the invention gives a laminate of outstanding evenness by conducting winding operation at one time unlike conventional techniques. A laminate of hollow circle in section is produced by use of a tubular take-up drum such as a mandrel. In short, a laminate excellent in uniformity and having the desired bulk density or bulk density distribution can be efficiently formed by the simple procedure of controlling the tensile force to be exerted during winding.

The tensile force to act on the film and/or net and the winding rate can be suitably determined according to the desired bulk density or bulk density distribution, strength of film and/or net, productivity of the desired laminate, etc.

While the winding operation is performed with a tensile force acting on the film and/or net, it is preferred to accomplish the winding with a pressure roller disposed above the take-up drum to press the felt piece and the film and/or net. Due to the action of the pressure roller, pressure can be uniformly applied over the felt piece and the film and/or net to compress them with the result that the obtained laminate assures the bonding of the felt layers to the film and/or net with the resin and a remarkable uniformity and that the bulk density of the felt piece can be controlled with a higher precision because of the tensile force acting on the film and/or net as well as such pressure and the obtained laminate is given the desired bulk density or bulk density distribution.

Stated more specifically, when a resin-impregnated felt piece is wound together with a film and/or net, the felt piece can be uniformly pressed and compressed under the desired pressure by a pressure roller, assuring the bonding of the felt piece to the film and/or net with the resin, whereby a laminate of further increased uniformity is obtained.

The pressure to be applied by the pressure roller can be suitably determined according to the degree of uniformity of the desired laminate, and is usually in the range of about 5 to about 50 kg/cm².

A laminate of the desired bulk density can be also produced when a film and/or net and a felt piece is wound in the same manner as above such that the film and/or net retaining a resin both on the front and rear sides is interposed between adjacent felt layers or only between a suitable number of felt layers without impregnation of resin into the felt piece. More specifically when a film and/or net and a felt piece are wound in such way that the film and/or net retaining a resin is inserted, for example, between the two felt pieces unimpregnated with the resin, the resin merely deposited on the film and/or net by dipping or like coating means assures the bonding of the felt layers to the film and/or net. Since the resin need not be impregnated into the felt piece in this case, the producing process can be simplified. Moreover, this process can reduce the amount of the resin to be retained in the film and/or net, significantly decreasing the amount of the powder of the resin carbonized in the carbonizing step.

The foregoing winding operation will be described below in more detail with reference to the accompanying drawings.

Figure 2:
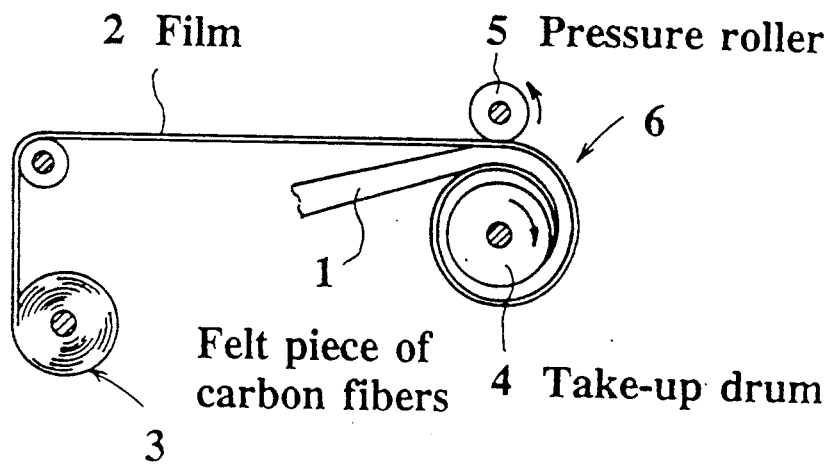
FIG. 2 is a diagram schematically showing a take-up device and the winding operation in progress.

FIG. 2 is a diagram schematically showing a take-up device and the winding operation in progress. A film is used in this embodiment. The take-up device comprises a casing (not shown) for accommodating a felt piece 1 of carbon fibers or the like and a film feeder 3 having tension controlling means (not shown) for controlling the tension to be exerted on the film 2 due to the winding of the film 2 and the friction or the like.

The take-up device 6 includes, at its end as opposed to the film feeder 3, a take-up drum 4 rotatable by a driving source such as a motor (not shown) and a rotatable pressure roller 5 disposed at a predetermined spacing above the take-up drum 4. The felt piece used in this embodiment is one having a resin impregnated therein by applying and drying a resin solution.

For production of a tubular laminate using the take-up device 6 of the foregoing structure, the felt piece 1 and the film 2 are fixed at their ends to the take-up drum 4 before winding, and are wound on the take-up drum 4 by feeding the felt piece 1 under a specific tensile force exerted on the film 2 by the tension controlling means while being pressed by the pressure roller 5.

The take-up device may have a container (not shown) containing a resin solution for impregnating the felt piece 1 therewith. In the embodiment, a pair of squeezing rollers (not shown) for squeezing the excess of resin solution from the felt piece 1 may be provided between the casing and the take-up drum 4, and guide means comprising a plurality of rollers for guiding the felt piece 1 may be mounted between the squeezing rollers and the take-up drum 4 to guide smoothly the felt piece 1 fed from the casing, under protection against the breaking of felt piece. Alternatively the resin solution may be applied to the film 2 by dipping, roller coating or like coating means and thereafter the film 2 coated therewith may be wound along with the felt piece 1.

Figure 3:
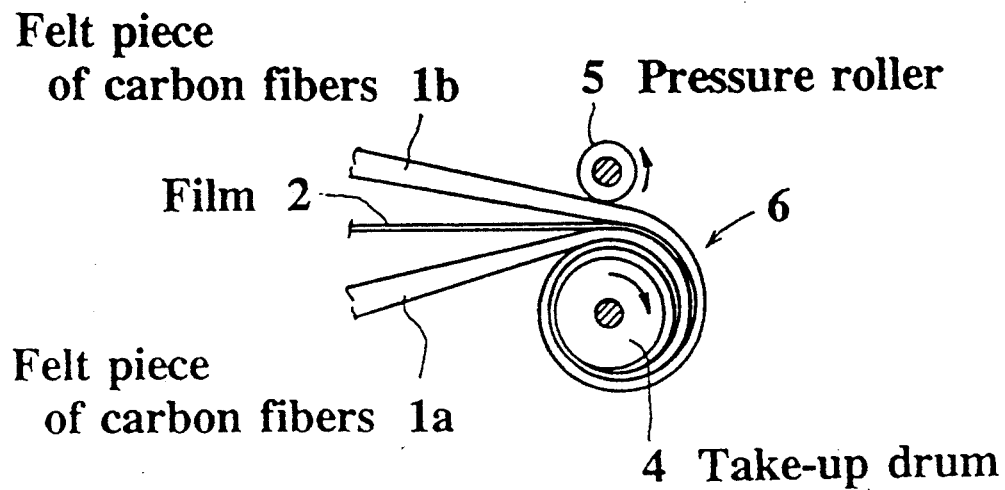
FIG. 3 is a diagram schematically showing the winding operation being otherwise conducted.

When using a resin-coated or a resin-uncoated film and a resin-impregnated felt piece, the film and felt piece are wound on the take-up drum 4 under the pressure applied by the pressure roller 5 while the resin-coated film 2 is pinched between a plurality of felt pieces 1a, 1b as shown in FIG. 3.

A drier for drying a resin solution-impregnated felt piece and a resin solution-coated film and/or net may be provided in the proximity of a passage for transport of the felt piece and in the vicinity of a passage for transport of the film and/or net. The laminate obtained by completion of winding is cured and subjected to carbonizing treatment by a usual method, whereby the carbonizable film and/or net and resin are carbonized.

In the carbonizing step, the felt layers are integrally bonded to each other with the aid of the carbonized layers of the film and/or net and the resin interposed between the felt layers, consequently giving a formed thermal insulator having an excellent uniformity and the desired bulk density and bulk density distribution.

The carbonizing step is executed in an atmosphere of nitrogen or like inert gas or in a vaccum at a suitable temperature, e.g., 1,500° to 3,000° C.

In the winding step, a resin solution-impregnated felt piece and a resin solution-coated film and/or net may be used before or after drying the resin solution. In the winding step, the felt piece and the film and/or net may be wound from the outset with the felt piece laid between the film and/or net and the take-up drum. Alternatively only the film and/or net may be wound on the take-up drum at the outset by a suitable number of revolutions and thereafter the felt piece and film and/or net may be wound in the above manner.

Take-up drums of varying sectional shapes can be selected to form a laminate having the desired corresponding sectional shape. When the felt piece and the film and/or net are wound on a take-up drum of circular shape in section as shown in drawings, a laminate of hollow circular section can be obtained.

Figure 5:
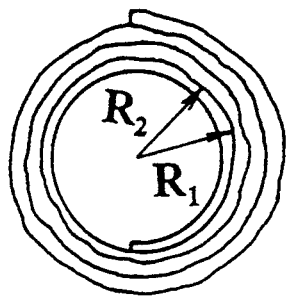
FIG. 5 is a schematic diagram showing in cross section the formed tubular thermal insulator prepared by a conventional process.

The formed thermal insulator as shown in FIG. 5 is one produced by the conventional method in which a felt piece of carbon fibers is prepared, a resin is impregnated into the felt piece, the felt piece is wound on a take-up drum into a spirally wound laminate, the laminate is enclosed with a band to cover the outer circumferential surface, and the resin is cured and carbonized. Since the strength of the felt piece is so low and the felt piece can not be subjected to a great tensile force during the winding, the laminate thus obtained is externally enclosed with a metal band in a squeezed state to increase the bulk density. The product obtained by subsequently carbonizing the resin has numerous wavy deformities of the spiral winding form, which remain in the final product.

Figure 6:
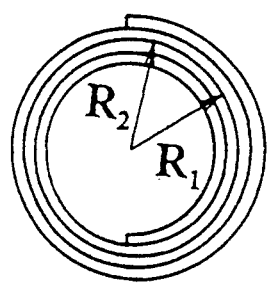
FIG. 6 is a schematic diagram showing in cross section the formed tubular thermal insulator prepared by the process of the invention.

In contrast, the winding operation is conducted exerting a tensile force on the winding for compression according to the process of the invention, whereby the resulting formed thermal insulator is free of wavy deformations between the layers as shown in FIG. 6 and has a good appearance and an excellent heat insulation property due to the uniform bulk density in a circumferential direction.

In the final winding stage, only the film and/or net may be wound by a suitable number of revolutions around the felt piece positioned on the outermost surface of the laminate. In this case, a resin is provided on the internal surface of the film and/or net to be brought into contact with the felt piece before winding, or alternatively one end of the film and/or net may be adhered after winding in order to prevent the undoing of the laminate. Usable as a take-up drum is that made of carbonizable materials such as plastics. Such take-up drum may be subjected to carbonization as it is without removal of the laminate therefrom and the resulting carbonized plastics may be finally eliminated. For withdrawal of a tubular laminate from the take-up drum, the tubular laminate may be taken out from the take-up drum, or the tubular laminate may be cut longitudinally and the film and/or net may be wound by a suitable number of revolutions. In the case of cutting in a longitudinal direction, the ends of the laminate may be attached together with a metal band or the like when required after completion of winding.

Preferred processes for preparing the formed thermal insulator of the present invention include:

a process for preparing a formed thermal insulator, the process comprising the steps of: causing at least one of a felt piece of carbon fibers and a film and/or net, preferably a polyester film and/or net, to retain a carbonizable thermosetting resin, preferably a thermosetting phenolic resin; winding the felt piece and the film and/or net on a tubular take-up drum to form a laminate; and carbonizing the film and/or net and the resin in the laminate, a tensile force, preferably a great tensile force in the initial winding stage, being controllably exerted on the film and/or net while the film and/or net is wound with the felt piece layers interposed under the pressure applied to the winding with a pressure roller.

The formed thermal insulator of the present invention is excellent in uniformity, dimensional precision, work efficiency involved in its installation, heat insulation property and the like, and thus are very useful as thermal insulators for use, for example, in sintering ceramics or calcining special carbonaceous materials at high temperatures.

Figure 4:
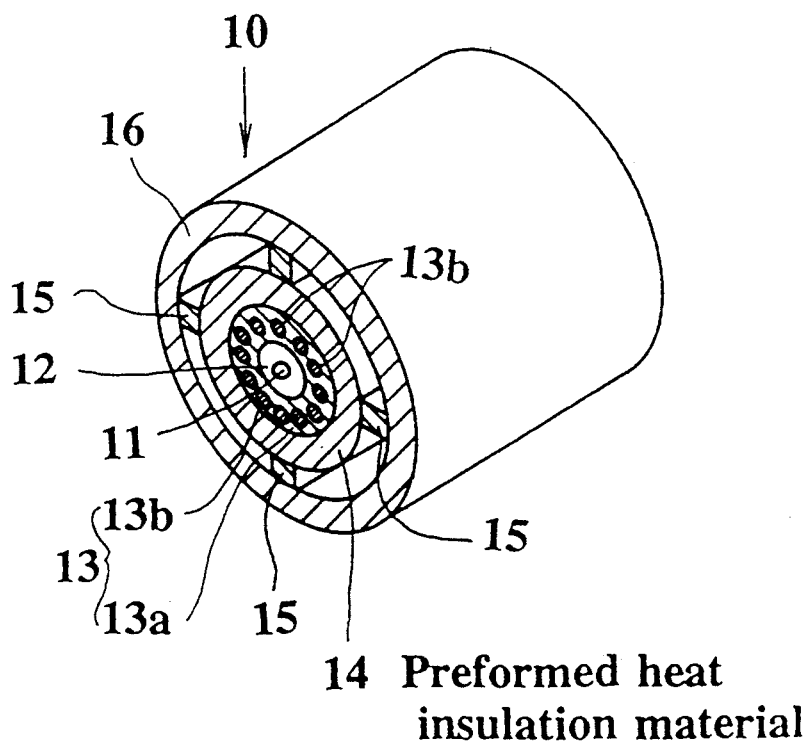
FIG. 4 is a perspective view showing in section a formed tubular thermal insulator installed on a vacuum furnace by way of example.

FIG. 4 is a perspective view showing in section the formed tubular thermal insulator of the invention installed on a vacuum furnace by way of example. A vacuum furnace 10 comprises a hollow space 12 for accommodating, e.g. a sintering material 11 to be heat-treated at high temperatures, tubular heating means 13 arranged around the hollow space 12 for heating the sintering material 11, a formed tubular thermal insulator 14 for heat insulation and heat preservation around the heating means 13, a cooling jacket 16 made of steel and attached to the formed thermal insulator 14 through spacers 15 arranged in a circumferential direction as spaced away from each other at a specific interval. The heating means 13 comprises graphite tubes 13a and electric heaters 13b made of graphite and enshrined in the graphite tube 13a. The formed tubular thermal insulator 14 in this embodiment has a thickness of about 50 to about 100 mm and an outside diameter of about 300 to about 1,500 mm.

The vacuum furnace 10 is operated at a temperature of about 2,000° C. or higher and a vacuum degree of about $10^{-1}$ torr. The furnace has an outstanding heat insulation ability because of the formed tubular thermal insulator arranged around the heating means 13 so that the amount of water or like cooling medium to be supplied to the cooling jacket 16 can be reduced.

The formed thermal insulator need not be installed in a tubular form as it is on an article to be provided therewith and may be suitably cut before use according to the shape of the article. The insulation material may be cut longitudinally before mounting in case of installation on an article of extended length like a pipe.

EXAMPLES

The present invention will be described below in greater detail with reference to the following Examples.

EXAMPLE 1

A carbon fiber felt piece having a bulk density of 0.05 g/cm$^3$, a weight (METSUKE) of 500 g/cm$^2$, a fiber diameter of 13 $\mu$m, a thickness of 100 mm and a width of 300 mm was impregnated with 60 parts by weight of a solution of resol-type phenolic resin (Gun-ei Chemical Industry Co., Ltd.) per 100 parts by weight of the carbon fiber felt piece, the solution comprising 70% by weight of solids content and 30% by weight of methyl ethyl ketone. The felt piece was dried at 80° C. for 1 hour to remove the methyl ethyl ketone.

A polyester film (tradename LUMIRROR, product of Toray Industries Inc.) having a thickness of 40 $\mu$m and a width of 400 mm was mounted onto a mandrel of 300 mm diameter. The resin-impregnated carbon fiber felt piece was inserted into between the film and the mandrel while a pressure of 15 kg/cm$^2$ was applied with a pressure roller.

While the film was subjected to the friction induced by a film feeder and to a tensile force, the carbon fiber felt piece and the film were wound by rotating the mandrel until a laminate of about 50 mm thickness was formed. The film alone was further wound two-fold around the outer surface of the laminate and one end thereof was adhered to the laminate.

The resin of the obtained laminate was cured at a temperature of 180° for 3 hours and the cured resin was carbonized at a temperature of 800° C. for 1 hour in an inert atmosphere. The resulting carbon was further heat-treated at a temperature of 2,000° C. for 1 hour, whereby a formed thermal insulator was produced.

The bulk density of the obtained formed thermal insulator as measured was about 0.15 g/cm$^3$. The heat conductivity of the formed thermal insulator as measured at 2,000° C. was 1.1 Kcal/m.h.° C. The surface smoothness of the formed thermal insulator was visually evaluated and found to have substantially no surface irregularity, hence excellent in uniformity. Also no unevenness was recognized between the spiral layers of the laminate. The laminate had orderly arranged spiral layers with the radius continuously augmenting from the center of the winding.

EXAMPLE 2

While a film was subjected to a tensile force, a carbon fiber felt piece and the film were wound until a laminate of about 25 mm thickness was formed. A formed thermal insulator was produced in the same manner as in Example 1 except that the carbon fiber felt piece and the film were further wound while a lower tension was applied to the film until a laminate of about 50 mm thickness was obtained.

The obtained formed thermal insulator was divided into internal and external parts to measure the bulk density of each part in the same manner as in Example 1. The internal bulk density was about 0.2 g/cm$^3$ and the external bulk density about 0.1 g/cm$^3$. The bulk density was found to have discontinuously varied. The formed thermal insulator had substantially no surface irregularity, hence excellent in uniformity.

EXAMPLE 3

A formed thermal insulator was prepared in the same manner as in Example 1 except that the application of pressure by the pressure roller was not done and an increased tension was exerted on the. film.

The bulk density of the obtained formed thermal insulator was measured in the same manner as in Example 1 and was about 0.15 g/cm$^3$. The formed thermal insulator had substantially no surface irregularity, hence excellent in uniformity.

EXAMPLE 4

A formed thermal insulator was prepared in the same manner as in Example 1 with the exception of using a carbon fiber felt piece of the type as used in Example 1 but not impregnated with the resin and a film coated with 150 g/m$^2$ of the resin solution. The bulk density of the obtained formed thermal insulator was measured in the same manner as in Example 1 and was about 0.1 g/cm$^3$. The formed thermal insulator had substantially no surface irregularity, hence excellent in uniformity.

The formed thermal insulators obtained according to the invention had a bending strength of 0.3 to 0.36 MPa, a longitudinal shrinkage factor of about 0.5% and a lateral shrinkage factor of about 0.5%. These results reveal that despite the carbonized layers of the film present between the carbon fiber felt layers, no significant difference existed between the formed thermal insulators in respect of the bending strength and shrinkage factor.

We claim:

1. A formed tubular thermal insulator the improvement wherein a felt piece of carbon fibers is spirally wound to form a laminate of felt layers so that the felt layers are integrally bonded to each other with a carbonized resin present between the felt layers and are continuously laminated in a circumferential direction without wavy deformation of spiral winding form and wherein the thermal insulator has a bulk density which decreases from the interior toward the exterior of the thermal insulator.

2. A formed tubular thermal insulator according to claim 1 which has a bulk density of about 0.08 to about 0.5 g/cm$^3$.

3. A formed tubular thermal insulator according to claim 1 which has a bulk density of about 6.1 to about 0.3 g/cm$^3$.

4. A formed tubular thermal insulator according to claim 1 which has a bulk density of about 0.1 to about 0.2 g/cm$^3$.

5. A formed tubular thermal insulator according to claim 1, wherein the bulk density decreases from the interior toward the exterior of the thermal insulator and wherein the insulator is capable of use at temperatures of at least about 650° C.

* * * * *